United States Patent
Lee et al.

(10) Patent No.: US 10,545,380 B2
(45) Date of Patent: Jan. 28, 2020

(54) LIQUID CRYSTAL MATERIAL, LIQUID CRYSTAL DISPLAY PANEL, AND METHOD FOR MANUFACTURING THE LIQUID CRYSTAL DISPLAY PANEL

(71) Applicant: Shenzhen China Star Optoelectronics Technology Co. Ltd., Shenzhen, Guangdong (CN)

(72) Inventors: Yung Jui Lee, Guangdong (CN); Hsiao Hsien Chen, Guangdong (CN); Song Lan, Guangdong (CN); Xiaolong Ma, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 102 days.

(21) Appl. No.: 15/563,439

(22) PCT Filed: Jul. 13, 2017

(86) PCT No.: PCT/CN2017/092690
§ 371 (c)(1),
(2) Date: Sep. 29, 2017

(87) PCT Pub. No.: WO2018/214251
PCT Pub. Date: Nov. 29, 2018

(65) Prior Publication Data
US 2019/0121177 A1     Apr. 25, 2019

(30) Foreign Application Priority Data
May 26, 2017   (CN) .......................... 2017 1 0383852

(51) Int. Cl.
*C09K 19/56*   (2006.01)
*G02F 1/1337*  (2006.01)
(Continued)

(52) U.S. Cl.
CPC ............ *G02F 1/1337* (2013.01); *C09K 19/56* (2013.01); *G02F 1/1341* (2013.01);
(Continued)

(58) Field of Classification Search
CPC ...................................... C09K 19/56
See application file for complete search history.

(56) References Cited

U.S. PATENT DOCUMENTS

2018/0120652 A1* 5/2018 Lan ................... C09K 19/3458

FOREIGN PATENT DOCUMENTS

| CN | 102402084 A |   | 4/2012 |               |
|----|-------------|---|--------|---------------|
| CN | 105733608 A | * | 7/2016 | C09K 19/3458  |

(Continued)

OTHER PUBLICATIONS

International Search Report, dated Feb. 28, 2018, for International Patent Application No. PCT/CN2017/092690.
(Continued)

*Primary Examiner* — Chanceity N Robinson

(57) ABSTRACT

A liquid crystal material for a liquid crystal display panel is used to form a polymer film on a substrate on which no PI layer is provided so as to realize normal display of the liquid crystal panel. Meanwhile, realiability of the panel can be improved, a voltage holding rate can be improved, and poor alignment of the self-alignment liquid crystal material, after-image, and other problems can be solved.

18 Claims, 1 Drawing Sheet

(51) Int. Cl.
*G02F 1/1341* (2006.01)
*G02F 1/1333* (2006.01)
*G02F 1/1368* (2006.01)

(52) U.S. Cl.
CPC ...... *G02F 1/133723* (2013.01); *G02F 1/1368* (2013.01); *G02F 2001/13415* (2013.01); *G02F 2001/133397* (2013.01); *G02F 2001/133715* (2013.01); *G02F 2001/133742* (2013.01); *G02F 2001/133773* (2013.01)

(56) References Cited

FOREIGN PATENT DOCUMENTS

| CN | 105733608 | A |   | 7/2016 |
|----|-----------|---|---|--------|
| CN | 105936830 | A |   | 9/2016 |
| CN | 105974683 | A | * | 9/2016 |
| CN | 106281363 | A | * | 1/2017 |
| CN | 106281363 | A |   | 1/2017 |
| CN | 106281364 | A |   | 1/2017 |
| CN | 106833677 | A |   | 6/2017 |
| EP | 0245935   | A1|   | 11/1987|

OTHER PUBLICATIONS

Chinese Office Action, dated Apr. 4, 2018, for Chinese Patent Application No. 201710383852.7.

\* cited by examiner

LIQUID CRYSTAL MATERIAL, LIQUID CRYSTAL DISPLAY PANEL, AND METHOD FOR MANUFACTURING THE LIQUID CRYSTAL DISPLAY PANEL

CROSS REFERENCE TO RELATED APPLICATIONS

The present application claims the priority of Chinese patent application CN201710383852.7, entitled "Liquid crystal material, liquid crystal display panel, and method for manufacturing the liquid crystal display panel" and filed on May 26, 2017, the entirety of which is incorporated herein by reference.

FIELD OF THE INVENTION

The present disclosure relates to the technical field of display, and particularly to a liquid crystal material, a liquid crystal display panel, and a method for manufacturing the liquid crystal display panel.

BACKGROUND OF THE INVENTION

With the development of display technology, Liquid Crystal Display (LCD) and other flat display devices are widely used in various electronic products such as mobile phone, TV, personal digital assistant, digital camera, laptop, desktop computer and so on due to advantages of high image quality, power saving, a small thickness, and a wide usage range. LCD has become a mainstream display device.

At present, most of the LCDs in the market belong to a backlight-type LCD, which comprises a liquid crystal display panel and a backlight module. An operating principle of the liquid crystal display panel is as follows: liquid crystal molecules are filled between two glass substrates which are parallel to each other; a plurality of fine wires are arranged between the two glass substrates in vertical direction and in horizontal direction; voltage is applied to the liquid crystal molecules so that the liquid crystal molecules can deflect; and light that is emitted by the backlight module can be refracted and an image can be displayed on the panel.

The liquid crystal display panel generally comprises a color filter substrate, a Thin Film Transistor (TFT) substrate, Liquid Crystal (LC) filled between the color filter substrate and the TFT substrate, and a sealant.

The color filter substrate and the TFT substrate of an LCD both are provided with a thin film material, a main role of which is enabling the liquid crystal molecules to be aligned in a certain direction. The thin film is called as alignment film and is generally made of polyimide (PI) material. The alignment film is mainly made of rubbing alignment PI material and optical alignment PI material. However, these two kinds of alignment materials each have their respective disadvantages. As to the rubbing alignment PI material, dust particles, electrostatic residue, brush marks and other problems would possibly be resulted in, and a qualified rate of the product would be reduced. If the optical alignment PI material is used, the above problems can be solved. However, the optical alignment PI material has a poor heat resistance and aging resistance, and a weak ability to anchor LC molecules, and thus a quality of the panel will be affected. Moreover, the PI material itself has a high polarity and a high water absorption, and properties thereof would be easily changed during storage and transportation procedures, which will result in non-uniform alignment of the liquid crystal. Furthermore, the PI material is expensive, and the deposition procedure of the PI material on a TFT-LCD is complicated, which will increase a cost of the panel.

Since the PI material has properties of uniformity, binding ability, and stability, in addition to the role of enabling the liquid crystal molecules to be aligned, the PI material can also serve as an insulating film between an upper substrate and a lower substrate of the liquid crystal display panel. In this manner, during one frame period, a voltage applied to the upper substrate and the lower substrate can be maintained, so that ions and other impurities in the two substrates can be prevented from diffusing into the liquid crystal, and a quality of the liquid crystal will not be affected.

If the PI film in a TFT-LCD is omitted, the liquid crystal molecules cannot be aligned in the vertical direction. There is a method to omit the PI film in a TFT-LCD, i.e., to add a vertical alignment agent to the liquid crystal. The surfactant can be adsorbed on a surface of an ITO substrate, and thus the liquid crystal molecules can be aligned in the vertical direction. The liquid crystal material containing the vertical alignment agent is called as a self-alignment liquid crystal material.

However, if the PI film is completely omitted, on the one hand, problems such as mura and poor liquid crystal alignment would occur on a panel, and on the other hand, an afterimage of the panel would become more serious.

SUMMARY OF THE INVENTION

The present disclosure provides a liquid crystal material, a liquid crystal display panel, and a method for manufacturing the liquid crystal display panel. According to the present disclosure, the liquid crystal material comprises liquid crystal molecules, a polymerizable monomer, and a vertical alignment agent. The polymerizable monomer and the vertical alignment agent experience polymerization reaction under ultraviolet irradiation to produce a polymer. The polymer is deposited on a substrate to form a polymer film which can replace an alignment film, whereby an alignment procedure of liquid crystal can be simplified, and a cost thereof can be reduced.

According to a first aspect, the present disclosure provides a liquid crystal material, which comprises liquid crystal molecules, a vertical alignment agent, and a polymerizable monomer, wherein the vertical alignment agent comprises one compound or more compounds selected from a group consisting of:

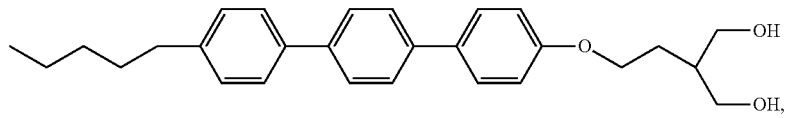 [SMILES: CCCCCc1ccc(-c2ccc(-c3ccc(OCCC(CO)CO)cc3)cc2)cc1]

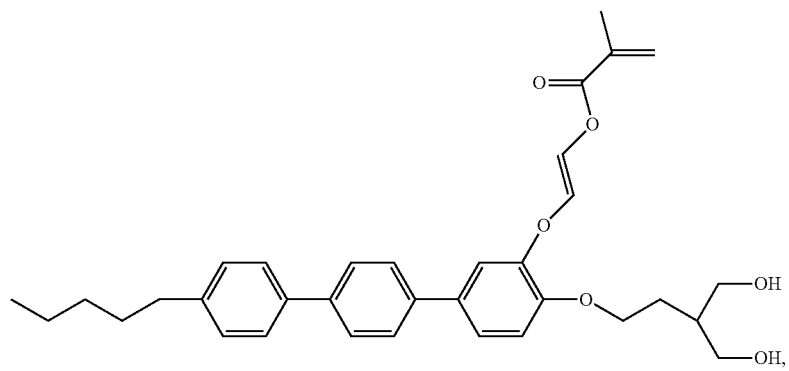 [SMILES: C=C(C)C(=O)O/C=C/Oc1cc(-c2ccc(-c3ccc(CCCCC)cc3)cc2)ccc1OCCC(CO)CO]

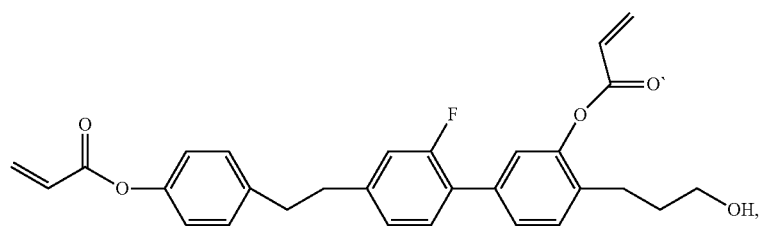

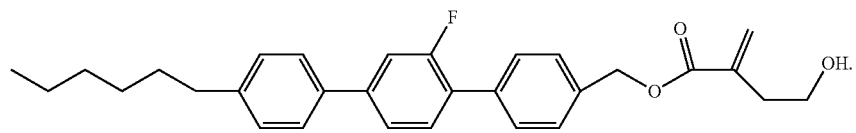 [SMILES: C=C(CCO)C(=O)OCc1ccc(-c2ccc(-c3ccc(CCCCCC)cc3)cc2F)cc1]

According to a preferred embodiment of the liquid crystal material of the present disclosure, the polymerizable monomer comprises one or more selected from a group consisting of acrylate and derivatives thereof, methacrylate and derivatives thereof, styrene and derivatives thereof, epoxy resin, and a fatty amine epoxy curing agent.

Preferably, the polymerizable monomer comprises one or two selected from:

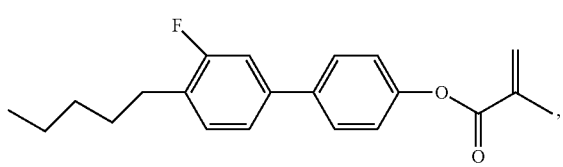 [SMILES: C=C(C)C(=O)Oc1ccc(-c2ccc(CCCCC)c(F)c2)cc1]

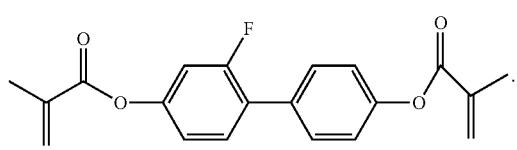 [SMILES: C=C(C)C(=O)Oc1ccc(-c2ccc(OC(=O)C(=C)C)cc2F)cc1]

According to a preferred embodiment of the liquid crystal material of the present disclosure, the liquid crystal material comprises 94 wt % to 99.8 wt % of the liquid crystal molecules.

According to a preferred embodiment of the liquid crystal material of the present disclosure, the liquid crystal material comprises 0.1 wt % to 5 wt % of the vertical alignment agent.

According to a preferred embodiment of the liquid crystal material of the present disclosure, the liquid crystal material comprises 0.1 wt % to 1 wt % of the polymerizable monomer.

According to a second aspect, the present disclosure provides a liquid crystal display panel, which comprises:

a first substrate, on which an alignment film is arranged;

a second substrate, on which a polymer film is arranged, wherein the second substrate is not provided with an alignment film, and the polymer film is formed by a vertical alignment agent and a polymerizable monomer after polymerization reaction; and a liquid crystal layer, which is arranged between the first substrate and the second substrate, wherein the liquid crystal layer comprises liquid crystal molecules.

In the liquid crystal display panel provided herein, one substrate is provided with the alignment film, and the other substrate is provided with a polymer film that is formed by the vertical alignment agent and the polymerizable monomer. On the one hand, a purpose of liquid crystal alignment can be realized, and on the other hand, poor alignment, afterimage and other problems of a self-alignment liquid crystal material can be avoided.

According to a preferred embodiment of the liquid crystal display panel of the present disclosure, the first substrate is a TFT substrate, and the second substrate is a color filter substrate.

According to a preferred embodiment of the liquid crystal display panel of the present disclosure, the first substrate is a color filter substrate, and the second substrate is a TFT substrate.

According to a preferred embodiment of the liquid crystal display panel of the present disclosure, the alignment film is a polyimide film with a thickness preferably in a range from 30 nm to 120 nm.

According to a preferred embodiment of the liquid crystal display panel of the present disclosure, the vertical alignment agent comprises one compound or more compounds selected from a group consisting of:

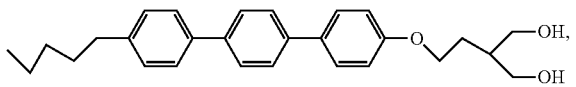 [SMILES: CCCCCc1ccc(-c2ccc(-c3ccc(OCCC(CO)CO)cc3)cc2)cc1]

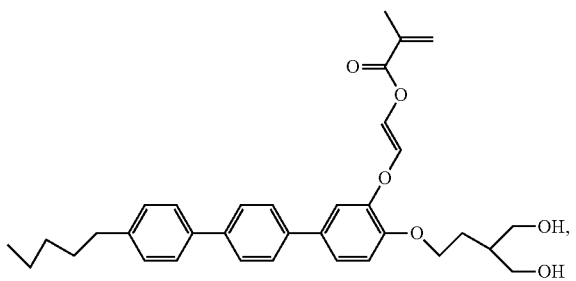 [SMILES: C=C(C)C(=O)O/C=C/Oc1cc(-c2ccc(-c3ccc(CCCCC)cc3)cc2)ccc1OCCC(CO)CO]

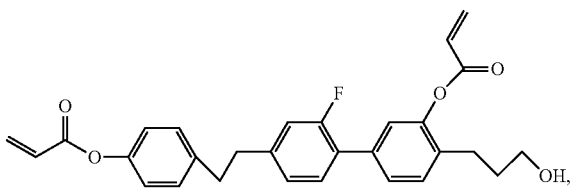 [SMILES: C=CC(=O)Oc1ccc(CCc2ccc(-c3ccc(CCCO)c(OC(=O)C=C)c3)c(F)c2)cc1]

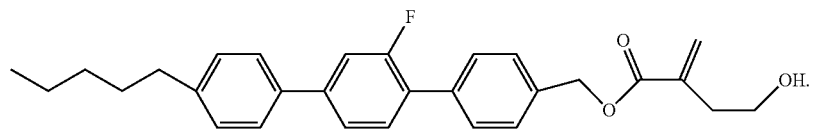 [SMILES: C=C(CCO)C(=O)OCc1ccc(-c2ccc(-c3ccc(CCCCC)cc3)cc2F)cc1]

According to a preferred embodiment of the liquid crystal display panel of the present disclosure, the polymerizable monomer comprises one or more selected from a group consisting of acrylate and derivatives thereof, methacrylate and derivatives thereof, styrene and derivatives thereof, epoxy resin, and a fatty amine epoxy curing agent.

Preferably, the polymerizable monomer comprises one or two selected from:

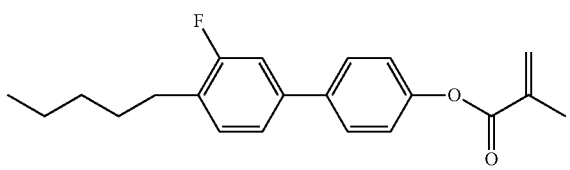 [SMILES: C=C(C)C(=O)Oc1ccc(-c2ccc(CCCCC)c(F)c2)cc1]

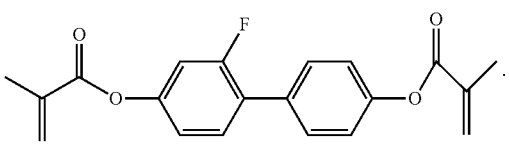 [SMILES: C=C(C)C(=O)Oc1ccc(-c2ccc(OC(=O)C(=C)C)cc2F)cc1]

According to a third aspect, the present disclosure provides a method for manufacturing a liquid crystal display panel. The method comprises steps of:

step 1, providing a first substrate, a second substrate, and a liquid crystal material respectively, wherein the first substrate is provided with an alignment film, and the second substrate is not provided with an alignment film;

step 2, dropwise adding the liquid crystal material on the second substrate, coating a sealant on a surface of the second substrate, and coating a conductive adhesive on a peripheral area of the second substrate;

step 3, fitting the first substrate and the second substrate after treatment in step 2 together, and curing the sealant;

step 4, applying a voltage to the liquid crystal material that is dropwise added on the second substrate so that liquid crystal molecules deflect, and irradiating the liquid crystal material with ultraviolet for a first time, so that a vertical alignment agent and a polymerizable monomer experience polymerization reaction, wherein a polymer produced by the polymerization reaction is deposited on a surface of the second substrate facing the liquid crystal material to form a polymer film; and step 5, cutting off the voltage, and irradiating the liquid crystal material, which has been irradiated by ultraviolet for the first time, with ultraviolet for a second time, so that residual vertical alignment agent and polymerizable monomer in the liquid crystal material experience polymerization reaction, wherein a polymer produced by the polymerization reaction is deposited on the polymer film formed in step 4.

According to a preferred embodiment of the method of the present disclosure, in step 1, the alignment film is a polyimide (PI) film, which is mainly a PI material used in a PSVA display mode. A thickness of the PI film is preferably in a range from 30 nm to 120 nm.

According to a preferred embodiment of the method of the present disclosure, the first substrate is a TFT substrate, and the second substrate is a color filter substrate.

According to another preferred embodiment of the method of the present disclosure, the first substrate is a color filter substrate, and the second substrate is a TFT substrate.

According to a preferred embodiment of the method of the present disclosure, the liquid crystal material comprises liquid crystal molecules, a vertical alignment agent, and a polymerizable monomer, wherein the vertical alignment agent comprises one compound or more compounds selected from a group consisting of:

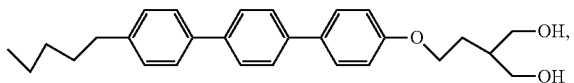

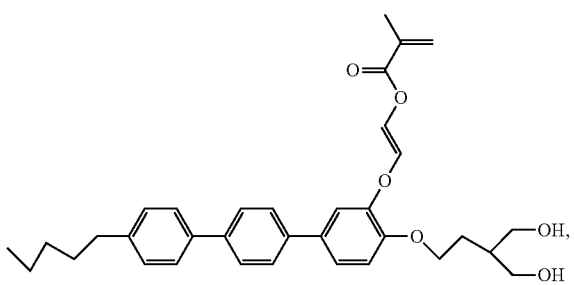 [SMILES: C=C(C)C(=O)O/C=C/Oc1cc(-c2ccc(-c3ccc(CCCCC)cc3)cc2)ccc1OCCC(CO)CO]

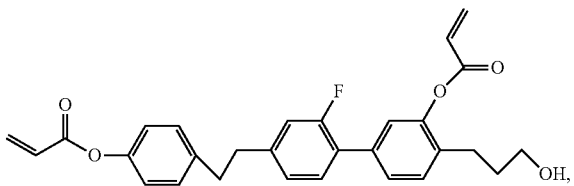

and

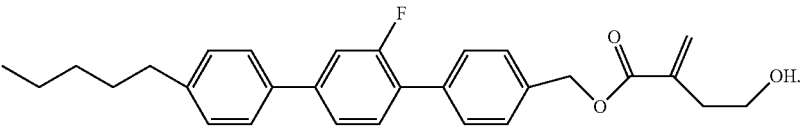 [SMILES: C=C(CCO)C(=O)OCc1ccc(-c2ccc(-c3ccc(CCCCC)cc3)cc2F)cc1]

According to a preferred embodiment of the method of the present disclosure, the polymerizable monomer comprises one or more selected from a group consisting of acrylate and derivatives thereof, methacrylate and derivatives thereof, styrene and derivatives thereof, epoxy resin, and a fatty amine epoxy curing agent.

Preferably, the polymerizable monomer comprises one or two selected from:

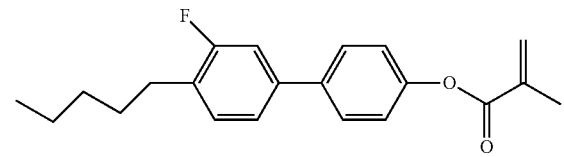 [SMILES: C=C(C)C(=O)Oc1ccc(-c2ccc(CCCCC)c(F)c2)cc1]

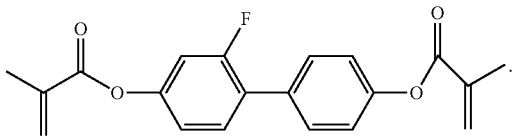 [SMILES: C=C(C)C(=O)Oc1ccc(-c2ccc(OC(=O)C(=C)C)cc2F)cc1]

According to a preferred embodiment of the method of the present disclosure, in step 1, the liquid crystal material comprises 94 wt % to 99.8 wt % of the liquid crystal molecules.

According to a preferred embodiment of the method of the present disclosure, in step 1, the liquid crystal material comprises 0.1 wt % to 5 wt % of the vertical alignment agent.

According to a preferred embodiment of the method of the present disclosure, in step 1, the liquid crystal material comprises 0.1 wt % to 1 wt % of the polymerizable monomer.

According to a preferred embodiment of the method of the present disclosure, step 3 is performed in a vacuum condition.

According to a preferred embodiment of the method of the present disclosure, in step 3, the curing is heat curing or UV curing.

According to a preferred embodiment of the method of the present disclosure, the voltage applied to the liquid crystal material is in a range from 13 V to 25 V.

According to a preferred embodiment of the method of the present disclosure, an energy of the ultraviolet used during ultraviolet irradiation for the first time ranges from 85 mW/cm$^2$ to 100 mW/cm$^2$, and an irradiation time ranges from 40 s to 100 s.

According to a preferred embodiment of the method of the present disclosure, an energy of the ultraviolet used during ultraviolet irradiation for the second time ranges from 85 mW/cm$^2$ to 100 mW/cm$^2$, and an irradiation time ranges from 90 min to 180 min.

According to a preferred embodiment of the method of the present disclosure, a thickness of the polymer film is in a range from 300 Å to 1200 Å.

During a manufacturing procedure of a TFT-LCD, a PI layer is formed on the TFT substrate or the color filter substrate, and a self-alignment liquid crystal material is used to form a polymer film on a substrate on which no PI layer is provided so as to realize normal display of the liquid crystal panel. Meanwhile, realiability of the panel can be improved, a voltage holding rate can be improved, and poor alignment of the self-alignment liquid crystal material, after-image, and other problems can be solved.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

Figure 1:
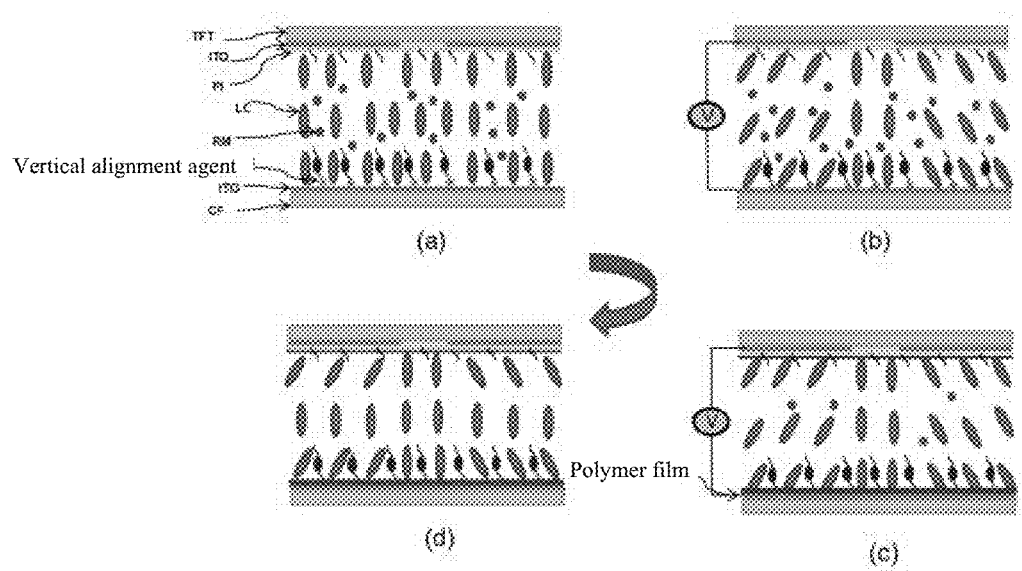
FIG. 1 schematically shows an embodiment of a method for manufacturing a liquid crystal display panel according to the present disclosure.
Figure 2:
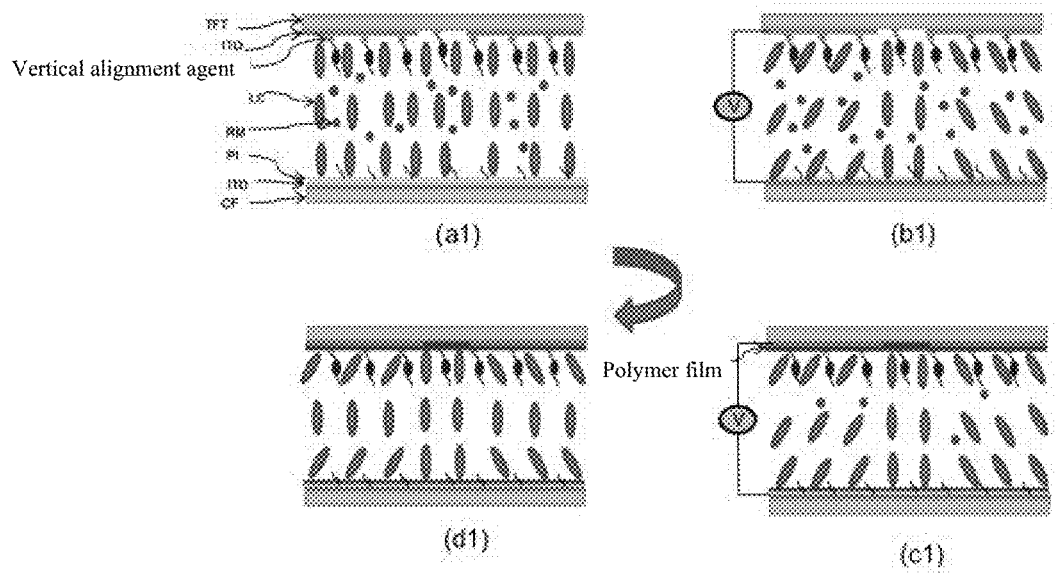
FIG. 2 schematically shows another embodiment of a method for manufacturing a liquid crystal display panel according to the present disclosure.

The present disclosure will be illustrated in detail hereinafter with reference to the embodiments. However, the present disclosure is not limited by the embodiments disclosed herein.

Embodiment 1

A TFT substrate, a color filter substrate, and a self-alignment liquid crystal material are provided, wherein the TFT substrate is provided with a PI film with a thickness of 100 nm, and the color filter substrate is not provided with a PI film. In the self-alignment liquid crystal material, a ratio of the vertical alignment agent, the polymerizable monomer, to the liquid crystal molecules is 0.5 wt %:0.3 wt %:99.2 wt %.

The vertical alignment agent has a structure of:

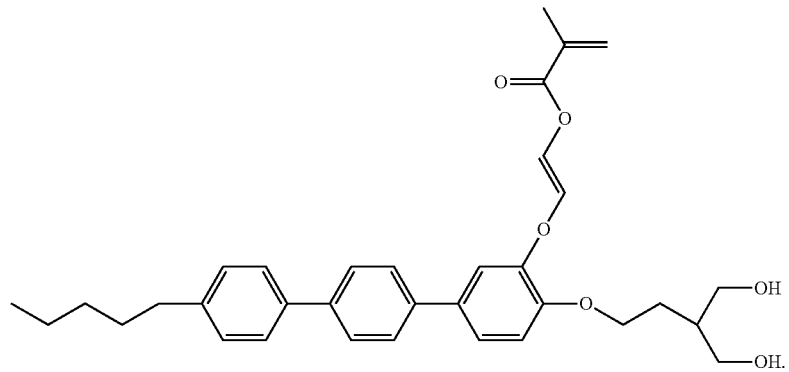

The polymerizable monomer has a structure of:

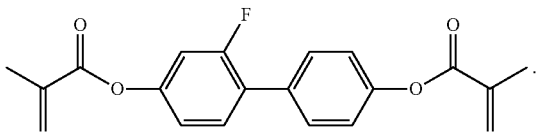

The liquid crystal material is dropwise added on the color filter substrate. A sealant is coated on a surface of the color filter substrate, and a conductive adhesive is coated on a peripheral area of the color filter substrate.

Then, in a vacuum environment, the TFT substrate and the treated color filter substrate are fitted together, and the sealant is cured by a heat curing method or UV curing method.

Next, a 13-25 V voltage is applied to the liquid crystal material that is dropwise added on the color filter substrate so that liquid crystal molecules can deflect. The liquid crystal material is irradiated by ultraviolet for a first time, so that the vertical alignment agent and the polymerizable monomer experience polymerization reaction. An energy of the ultraviolet used during ultraviolet irradiation for the first time ranges from 85 mW/cm$^2$ to 100 mW/cm$^2$, and an irradiation time ranges from 40 s to 100 s. A polymer produced by the polymerization reaction is deposited on a surface of the color filter substrate facing the liquid crystal material to form a polymer film.

At last, the voltage is cut off. The liquid crystal material is irradiated by ultraviolet for a second time, so that residual vertical alignment agent and polymerizable monomer in the liquid crystal material experience polymerization reaction. An energy of the ultraviolet used during ultraviolet irradiation for the second time ranges from 85 mW/cm$^2$ to 100 mW/cm$^2$, and an irradiation time ranges from 90 min to 180 min. A polymer produced by the polymerization reaction is deposited on the polymer film formed in a previous step. A thickness of the polymer film finally obtained is about 600 Å.

The liquid crystal material, in which the vertical alignment agent and the polymerizable monomer are removed, constitutes a liquid crystal layer, and thus a liquid crystal display panel is obtained.

Embodiment 2

A TFT substrate, a color filter substrate, and a self-alignment liquid crystal material are provided, wherein the TFT substrate is provided with a PI film with a thickness of 100 nm, and the color filter substrate is not provided with a PI film. In the self-alignment liquid crystal material, a ratio of the vertical alignment agent, the polymerizable monomer, to the liquid crystal molecules is 1.5 wt %:0.3 wt %:98.2 wt %.

The vertical alignment agent has a structure of:

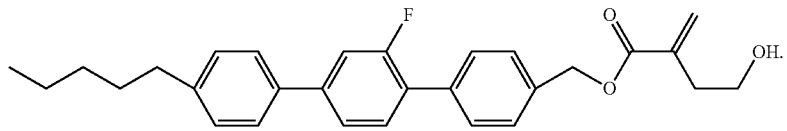 [SMILES: C=C(CCO)C(=O)OCc1ccc(-c2ccc(-c3ccc(CCCCC)cc3)cc2F)cc1]

The polymerizable monomer has a structure of:

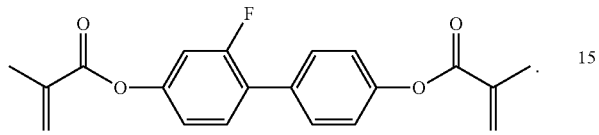

The liquid crystal material is dropwise added on the color filter substrate. A sealant is coated on a surface of the color filter substrate, and a conductive adhesive is coated on a peripheral area of the color filter substrate.

Then, in a vacuum environment, the TFT substrate and the treated color filter substrate are fitted together, and the sealant is cured by a heat curing method or UV curing method.

Next, a 13-25 V voltage is applied to the liquid crystal material that is dropwise added on the color filter substrate so that liquid crystal molecules can deflect. The liquid crystal material is irradiated by ultraviolet for a first time, so that the vertical alignment agent and the polymerizable monomer experience polymerization reaction. An energy of the ultraviolet used during ultraviolet irradiation for the first time ranges from 85 mW/cm$^2$ to 100 mW/cm$^2$, and an irradiation time ranges from 40 s to 100 s. A polymer produced by the polymerization reaction is deposited on a surface of the color filter substrate facing the liquid crystal material to form a polymer film.

At last, the voltage is cut off. The liquid crystal material is irradiated by ultraviolet for a second time, so that residual vertical alignment agent and polymerizable monomer in the liquid crystal material experience polymerization reaction. An energy of the ultraviolet used during ultraviolet irradiation for the second time ranges from 85 mW/cm$^2$ to 100 mW/cm$^2$, and an irradiation time ranges from 90 min to 180 min. A polymer produced by the polymerization reaction is deposited on the polymer film formed in a previous step. A thickness of the polymer film finally obtained is about 800 Å.

The liquid crystal material, in which the vertical alignment agent and the polymerizable monomer are removed, constitutes a liquid crystal layer, and thus a liquid crystal display panel is obtained.

Embodiment 3

A TFT substrate, a color filter substrate, and a self-alignment liquid crystal material are provided, wherein the TFT substrate is not provided with a PI film, and the color filter substrate is provided with a PI film with a thickness of 100 nm. In the self-alignment liquid crystal material, a ratio of the vertical alignment agent, the polymerizable monomer, to the liquid crystal molecules is 0.5 wt %:0.3 wt %:99.2 wt %.

The vertical alignment agent has a structure of:

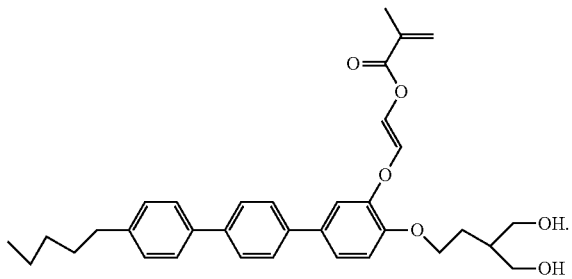 [SMILES: C=C(C)C(=O)O/C=C/Oc1cc(-c2ccc(-c3ccc(CCCCC)cc3)cc2)ccc1OCCC(CO)CO]

The polymerizable monomer has a structure of:

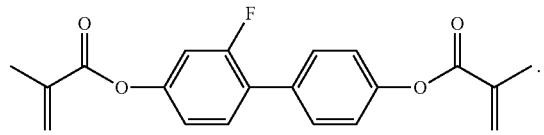 [SMILES: C=C(C)C(=O)Oc1ccc(-c2ccc(OC(=O)C(=C)C)cc2F)cc1]

The liquid crystal material is dropwise added on the TFT substrate. A sealant is coated on a surface of the TFT substrate, and a conductive adhesive is coated on a peripheral area of the TFT substrate.

Then, in a vacuum environment, the color filter substrate and the treated TFT substrate are fitted together, and the sealant is cured by a heat curing method or UV curing method.

Next, a 13-25 V voltage is applied to the liquid crystal material so that liquid crystal molecules can deflect. The liquid crystal material is irradiated by ultraviolet for a first time, so that the vertical alignment agent and the polymerizable monomer experience polymerization reaction. An energy of the ultraviolet used during ultraviolet irradiation for the first time ranges from 85 mW/cm$^2$ to 100 mW/cm$^2$, and an irradiation time ranges from 40 s to 100 s. A polymer produced by the polymerization reaction is deposited on a surface of the TFT substrate facing the liquid crystal material to form a polymer film.

At last, the voltage is cut off. The liquid crystal material is irradiated by ultraviolet for a second time, so that residual vertical alignment agent and polymerizable monomer in the liquid crystal material experience polymerization reaction. An energy of the ultraviolet used during ultraviolet irradiation for the second time ranges from 85 mW/cm$^2$ to 100 mW/cm$^2$, and an irradiation time ranges from 90 min to 180 min. A polymer produced by the polymerization reaction is deposited on the polymer film formed in a previous step. A thickness of the polymer film finally obtained is about 1100 Å.

The liquid crystal material, in which the vertical alignment agent and the polymerizable monomer are removed, constitutes a liquid crystal layer, and thus a liquid crystal display panel is obtained.

Comparative Embodiment 1

A TFT substrate, a color filter substrate, and a self-alignment liquid crystal material are provided, wherein the TFT substrate and the color filter substrate both are not provided with a PI film. In the self-alignment liquid crystal material, a ratio of the vertical alignment agent, the polymerizable monomer, to the liquid crystal molecules is 0.5 wt %:0.3 wt %:99.2 wt %.

The vertical alignment agent has a structure of:

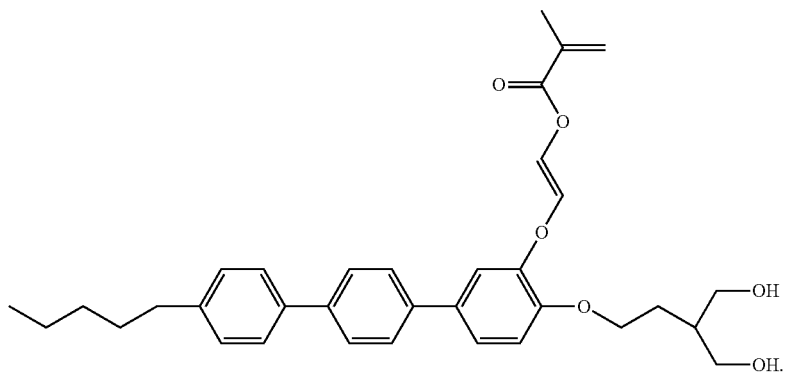 [SMILES: C=C(C)C(=O)O/C=C/Oc1cc(-c2ccc(-c3ccc(CCCCC)cc3)cc2)ccc1OCCC(CO)CO]

The polymerizable monomer has a structure of:

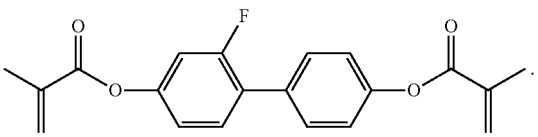

The liquid crystal material is dropwise added on the TFT substrate and the color filter substrate. A sealant is coated on a surface of the TFT substrate and the color filter substrate, and a conductive adhesive is coated on a peripheral area of the TFT substrate and the color filter substrate.

Then, in a vacuum environment, the treated color filter substrate and TFT substrate are fitted together, and the sealant is cured by a heat curing method or UV curing method.

Next, a 13-25 V voltage is applied to the liquid crystal material so that liquid crystal molecules can deflect. The liquid crystal material is irradiated by ultraviolet for a first time, so that the vertical alignment agent and the polymerizable monomer experience polymerization reaction. An energy of the ultraviolet used during ultraviolet irradiation for the first time ranges from 85 mW/cm$^2$ to 100 mW/cm$^2$, and an irradiation time ranges from 40 s to 100 s. A polymer produced by the polymerization reaction is deposited on the TFT substrate and the color filter substrate to form a polymer film.

At last, the voltage is cut off. The liquid crystal material is irradiated by ultraviolet for a second time, so that residual vertical alignment agent and polymerizable monomer in the liquid crystal material experience polymerization reaction. An energy of the ultraviolet used during ultraviolet irradiation for the second time ranges from 85 mW/cm$^2$ to 100 mW/cm$^2$, and an irradiation time ranges from 90 min to 180 min. A polymer produced by the polymerization reaction is deposited on the polymer film formed in a previous step. A thickness of the polymer film finally obtained is about 1100 Å.

The liquid crystal material, in which the vertical alignment agent and the polymerizable monomer are removed, constitutes a liquid crystal layer, and thus a liquid crystal display panel is obtained.

Table 1 shows performances of liquid crystal display panels manufactured by Embodiments 1 to 3 and Comparative Embodiment 1.

TABLE 1

| | If there is light leakage in dark state | Voltage holding rate (1 V, 60° C., 0.6 Hz) | If there is an afterimage | If there is a dark line |
|---|---|---|---|---|
| Embodiment 1 | No | 98.2% | No | No |
| Embodiment 2 | No | 98.0% | No | No |
| Embodiment 3 | No | 99.2% | No | No |
| Comparative Embodiment 1 | Slight light leakage | 97.5% | Yes | Yes |

It can be seen from Table 1 that, compared with Comparative Embodiment 1, in the liquid crystal display panels manufactured by Embodiments 1 to 3, a normal display can be realized, and a voltage holding rate can be improved. At the same time, poor alignment of the self-alignment liquid crystal material, afterimage and other problems can be solved.

The embodiments disclosed herein are used for illustrating, rather than restricting, the present disclosure. Although the embodiments are disclosed hereinabove, it can be understood that, various deformations can be made by those skilled in the art without departing from the teachings and advantages of the present disclosure, and all deformations are included in the scope as defined by the claims. It can be understood that, the embodiments disclosed herein are descriptive and illustrative ones, rather than restrictive ones. The protection scope of the present disclosure shall be determined by the claims.

What is claimed is:

1. A liquid crystal material, comprising liquid crystal molecules, a vertical alignment agent, and a polymerizable monomer, wherein the vertical alignment agent comprises one compound or more compounds selected from a group consisting of:

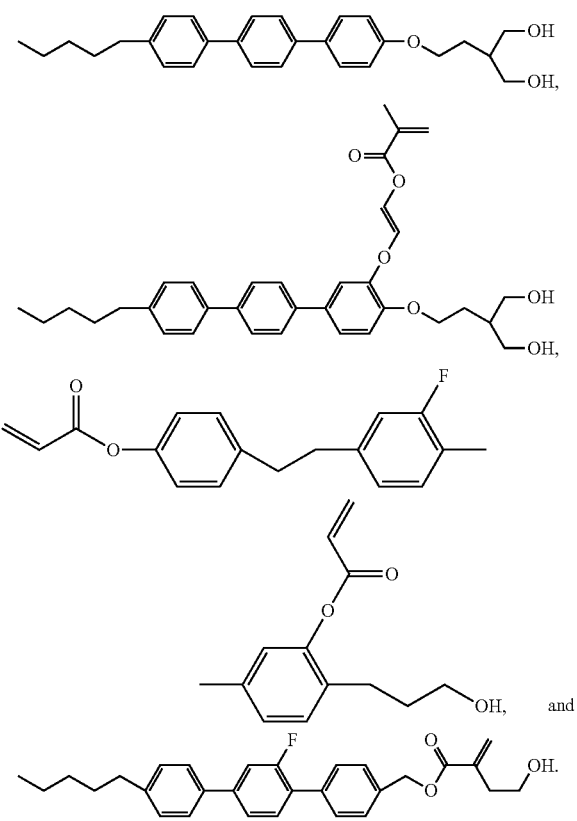

2. The liquid crystal material according to claim 1, wherein the polymerizable monomer comprises one or more selected from a group consisting of acrylate and derivatives thereof, methacrylate and derivatives thereof, styrene and derivatives thereof, epoxy resin, and a fatty amine epoxy curing agent.

3. The liquid crystal material according to claim 1, wherein the polymerizable monomer comprises one or two selected from:

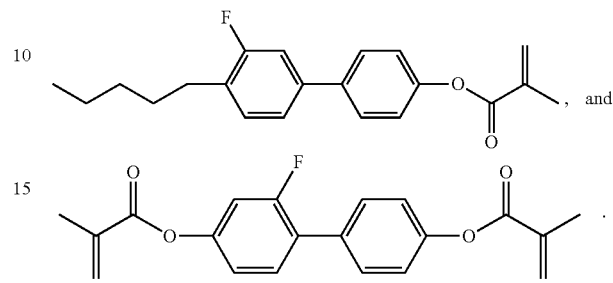

4. The liquid crystal material according to claim 1, wherein the liquid crystal material comprises 94 wt % to 99.8 wt % of the liquid crystal molecules, 0.1 wt % to 5 wt % of the vertical alignment agent, and 0.1 wt % to 1 wt % of the polymerizable monomer.

5. A liquid crystal display panel, comprising:
   a first substrate, on which an alignment film is arranged;
   a second substrate, on which a polymer film is arranged, wherein the second substrate is not provided with an alignment film, and the polymer film is formed by a vertical alignment agent and a polymerizable monomer after polymerization reaction; and
   a liquid crystal layer, which is arranged between the first substrate and the second substrate, wherein the liquid crystal layer comprises liquid crystal molecules;
   wherein the vertical alignment agent comprises one compound or more compounds selected from a group consisting of:

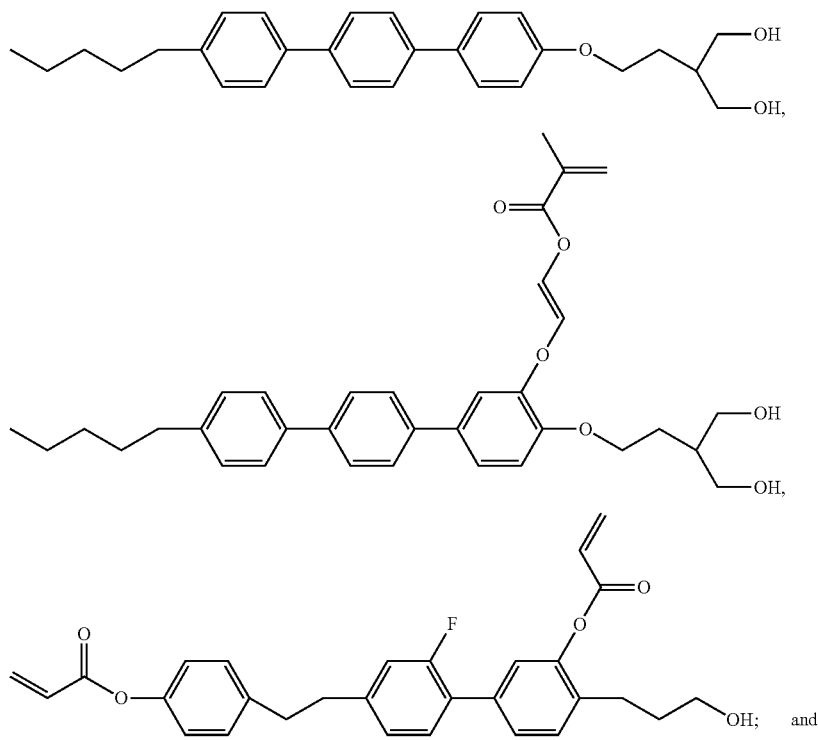

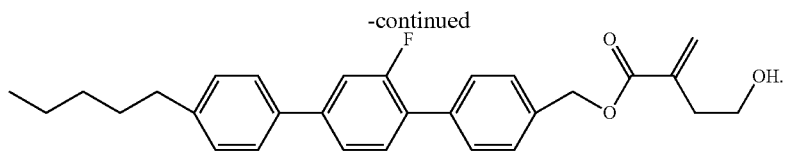

6. The liquid crystal display panel according to claim 5, wherein the alignment film is a polyimide film with a thickness in a range from 30 nm to 120 nm.

7. The liquid crystal display panel according to claim 5, wherein the first substrate is a TFT substrate, and the second substrate is a color filter substrate.

8. The liquid crystal display panel according to claim 5, wherein the first substrate is a color filter substrate, and the second substrate is a TFT substrate.

9. The liquid crystal display panel according to claim 5, wherein the polymerizable monomer comprises one or more selected from a group consisting of acrylate and derivatives thereof, methacrylate and derivatives thereof, styrene and derivatives thereof, epoxy resin, and a fatty amine epoxy curing agent.

10. The liquid crystal display panel according to claim 5, wherein the polymerizable monomer comprises one or two selected from:

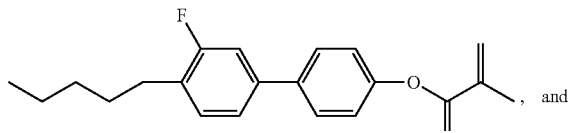, and

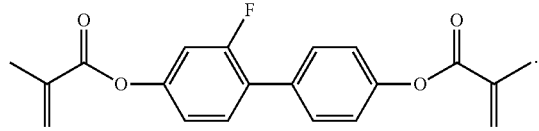 [SMILES: C=C(C)C(=O)Oc1ccc(-c2ccc(OC(=O)C(=C)C)cc2F)cc1]

11. A method for manufacturing a liquid crystal display panel, comprising steps of:
step 1, providing a first substrate, a second substrate, and a liquid crystal material respectively, wherein the first substrate is provided with an alignment film, and the second substrate is not provided with an alignment film;
step 2, dropwise adding the liquid crystal material on the second substrate, coating a sealant on a surface of the second substrate, and coating a conductive adhesive on a peripheral area of the second substrate;
step 3, fitting the first substrate and the second substrate after treatment in step 2 together, and curing the sealant;
step 4, applying a voltage to the liquid crystal material that is dropwise added on the second substrate so that liquid crystal molecules deflect, and irradiating the liquid crystal material with ultraviolet for a first time, so that a vertical alignment agent and a polymerizable monomer experience polymerization reaction, wherein a polymer produced by the polymerization reaction is deposited on a surface of the second substrate facing the liquid crystal material to form a polymer film; and
step 5, cutting off the voltage, and irradiating the liquid crystal material, which has been irradiated by ultraviolet for the first time, with ultraviolet for a second time, so that residual vertical alignment agent and polymerizable monomer in the liquid crystal material experience polymerization reaction, wherein a polymer produced by the polymerization reaction is deposited on the polymer film formed in step 4;
wherein the vertical alignment agent comprises one compound or more compounds selected from a group consisting of:

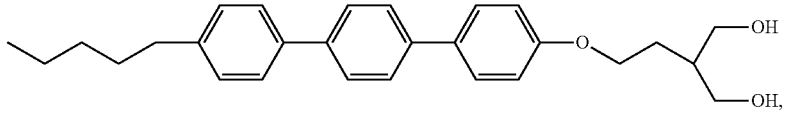

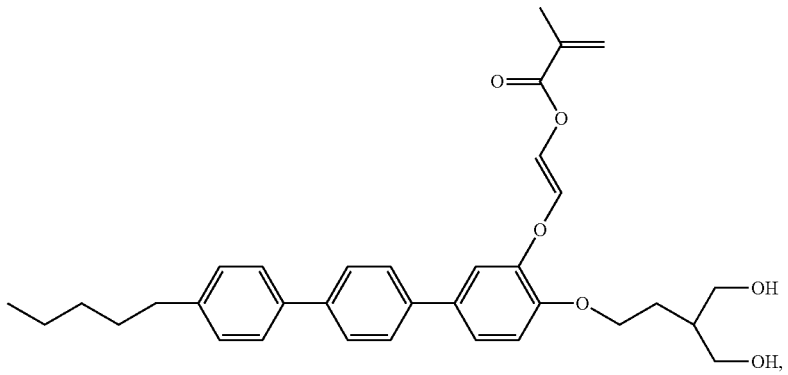

-continued

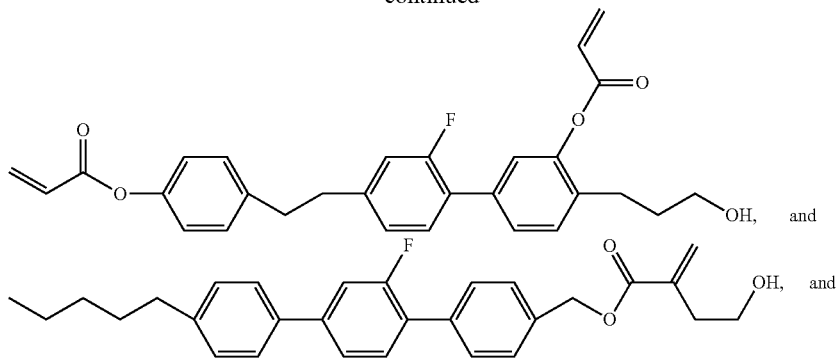

wherein the polymerizable monomer comprises one or more selected from a group consisting of acrylate and derivatives thereof, methacrylate and derivatives thereof, styrene and derivatives thereof, epoxy resin, and a fatty amine epoxy curing agent.

12. The method according to claim 11, wherein in step 4, the voltage applied to the liquid crystal material is in a range from 13 V to 25 V.

13. The method according to claim 11, wherein in step 4, an energy of the ultraviolet used during ultraviolet irradiation for the first time ranges from 85 $mW/cm^2$ to 100 $mW/cm^2$, and an irradiation time ranges from 40 s to 100 s.

14. The method according to claim 11, wherein in step 5, an energy of the ultraviolet used during ultraviolet irradiation for the second time ranges from 85 $mW/cm^2$ to 100 $mW/cm^2$, and an irradiation time ranges from 90 min to 180 min.

15. The method according to claim 11, wherein in step 1, the alignment film is a polyimide film with a thickness in a range from 30 nm to 120 nm.

16. The method according to claim 11, wherein in step 1, the first substrate is a TFT substrate, and the second substrate is a color filter substrate.

17. The method according to claim 11, wherein in step 1, the first substrate is a color filter substrate, and the second substrate is a TFT substrate.

18. The method according to claim 11, wherein a thickness of the polymer film finally obtained in step 5 is in a range from 300 Å to 1200 Å.

* * * * *